(12) United States Patent
Lin

(10) Patent No.: US 6,793,337 B1
(45) Date of Patent: Sep. 21, 2004

(54) NOSE PAD OF EYEGLASSES

(76) Inventor: Chun-Hung Lin, No.4, Lane 306, Sec.2, Tai Lin Rd., Taishan Shiang, Taipei Hsien (TW)

(*) Notice: Subject to any disclaimer, the term of this patent is extended or adjusted under 35 U.S.C. 154(b) by 0 days.

(21) Appl. No.: 10/701,445

(22) Filed: Nov. 6, 2003

(51) Int. Cl.⁷ .............................. G02C 1/00; G02C 5/12
(52) U.S. Cl. .......................... 351/80; 351/78; 351/136; 351/137; 351/138
(58) Field of Search ................................ 351/136, 137, 351/138, 41, 80, 78, 88, 76, 77, 79, 81, 82

(56) References Cited

U.S. PATENT DOCUMENTS 4,806,009 A * 2/1989 Sordillo et al. ............... 351/88

* cited by examiner

Primary Examiner—Hung Xuan Dang
(74) Attorney, Agent, or Firm—Rabin & Berdo, P.C.

(57) ABSTRACT

A nose pad of eyeglasses includes a nose rack, a fastener and a pad; an axis is on the nose rack, a sleeve corresponding to the axis is on the fastener, an insertion hole is on the sleeve for the axis to insert. The open of the insertion hole is smaller than the diameter of the axis, users can install and remove them easily, and avoid scratches and breakage during installation and removal.

6 Claims, 7 Drawing Sheets

NOSE PAD OF EYEGLASSES

BACKGROUND OF THE INVENTION

I. Field of the Invention

This invention relates generally to a nose pad of eyeglasses and, more specifically, to a nose pad of eyeglasses that can be stably fixed, that can be easily installed and removed by a user, and which avoids scratches and breakage during installation and removal.

II. Description of the Prior Art

Heretofore, the traditional nose pad of eyeglasses shown in FIGS. 1 and 2, includes a nose rack 10a, a fastener 20a and a nose pad 30a. An open hole 11a is formed on the nose rack 10a, and an insertion head 22a and a neck 21a are on the fastener 20a. The insertion head 22a passes through the open hole 11 a to have the neck 21a in the open hole 11a and to have the fastener 20a installed on the nose rack 10a.

Based on the structure described above, in order to have the fastener 20a and the nose rack 10a combine properly to prevent the fastener 20a from falling, the width of the insertion head 22a must be larger than that of the open hole 11a. Even though the top of the insertion head 22a has a smooth curved shape and is easy to insert, users have to push hard to have the insertion head 22a into the open hole 11a, so that the operation consumes lots of time and strength. Since the width of the insertion head 22a is larger than that of the open hole 11a, when users want to replace the nose pad 30a, they have to use tools and apply heavy strength to pull the insertion head 22a out of the open hole 11a. During installation and replacement, users have to apply heavy strength that might introduce scratches and breakage.

Another prior art device is shown in FIG. 3, FIG. 4 and FIG. 5 (U.S. Pat. No. 6,079,825). This device includes a nose rack 30b, a fastener 20b and a nose pad 2b. An open hole 31b is formed in the nose rack 30b, and an insertion head 22b and a neck 21b are on the fastener 20b. A center slot 23b is formed on the insertion head 22b. The center slot 23b divides the insertion head 22b into two on the center area. The insertion head 22b is larger than the open hole 31b. When the insertion head 22b passes through the open hole 31b, the two sides of the insertion head 22b are pressed by the open hole 31b toward the center slot 23b and pass through the open hole 31b to install the fastener 20b on the nose rack 30b.

Based on the structure described above, the center slot 23b on the insertion head 22b offers compression space to let the insertion head 22b more easily pass into the open hole 31b. However, the insertion head 22b will expand inside the open hole 31b after it passes through the open hole 31b. This arrangement prevents the neck 21b from moving freely in the open hole 31b, so that the fastener 20b and the nose pad 2b cannot be adjusted and so that the nose pad 2b cannot fit properly on user's noses. Users thus might feel uncomfortable and irritation, and the touching area of nose pad 2b might cause the user's nose to swell and be painful.

SUMMARY OF THE INVENTION

It is therefore a primary object of the invention to provide a nose pad of eyeglasses that can be fixed stably, users can install and remove them easily.

It is a further object of this invention to provide a nose pad of eyeglasses that can avoid scratches and breakage during installation and removal.

In order to achieve the objective set forth, a nose pad of eyeglasses in accordance with the present invention comprises a nose rack, a fastener and a pad; an axis is on the nose rack, a sleeve corresponding to the axis is on the fastener, an insertion hole is on the sleeve for the axis to insert, the open of the insertion hole is smaller than the diameter of the axis.

Based on the structure described above, the axis and the sleeve combine the nose rack and fastener together, the open of the insertion hole is smaller than the diameter of the axis, the nose rack and fastener can be fixed stably; the sleeve can move freely inside the insertion hole, installation and removal are very convenient. The width of the stem is smaller than that of the open hole; users can adjust the nose pad anytime.

In the application, the axis and the sleeve combine the nose rack and fastener together, the open of the insertion hole is smaller than the diameter of the axis, the nose rack and fastener can be fixed stably, the present invention has following advantages over the prior art:

1. Easy to assemble: a sleeve having elasticity with a insertion hole is on the fastener; while installation, users only have to have the insertion hole of the sleeve aim at the axis and push, the insertion hole of the sleeve opens slightly by the pressure from the axis, the insertion hole returns to normal after the insertion of the axis, the open of the insertion hole is smaller than the diameter of the axis to make the nose rack and fastener combine together, such assembly is fast and easy.

2. Easy to disassemble: the sleeve has elasticity, while disassembly, users only have to pull the axis out from the insertion hole of the sleeve, the insertion hole opens slightly and the axis can be pulled out smoothly, the operation is fast and easy without any tool.

3. No scratches and breakage: the top of the stem is very smooth without sharp point and is easy to install and remove without scratches and breakage, the usage life is longer.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
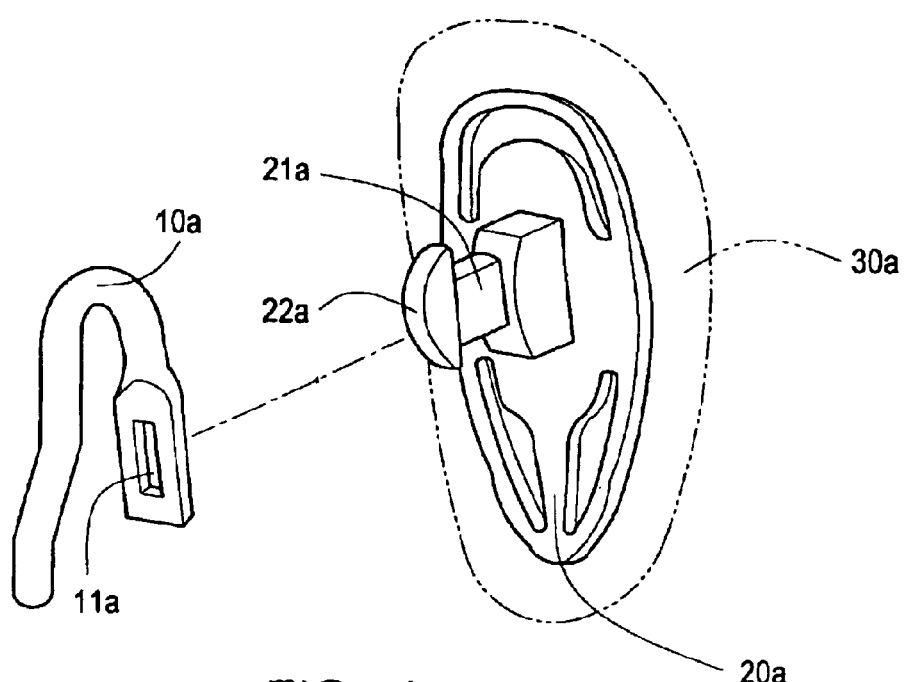
FIG. 1 is an assembly view of the prior art.
Figure 2:
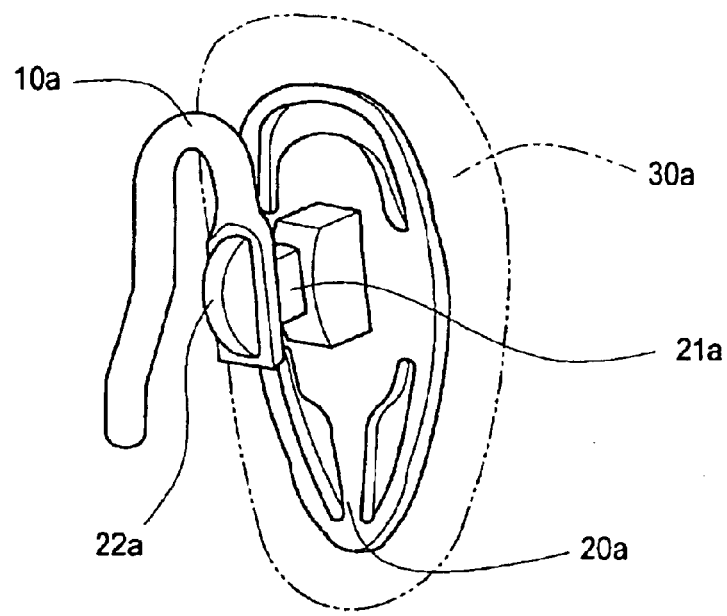
FIG. 2 is a perspective view of the prior art.
Figure 3:
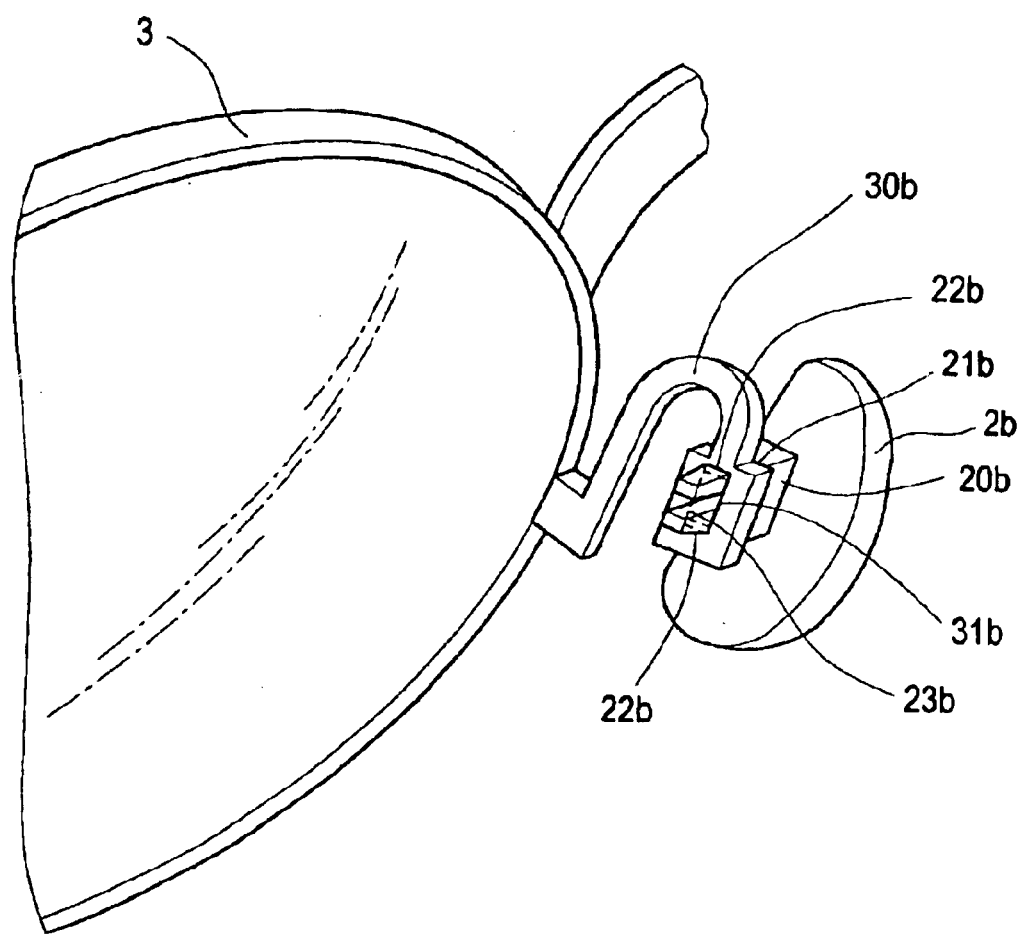
FIG. 3 is another perspective view of the prior art.
Figure 4:
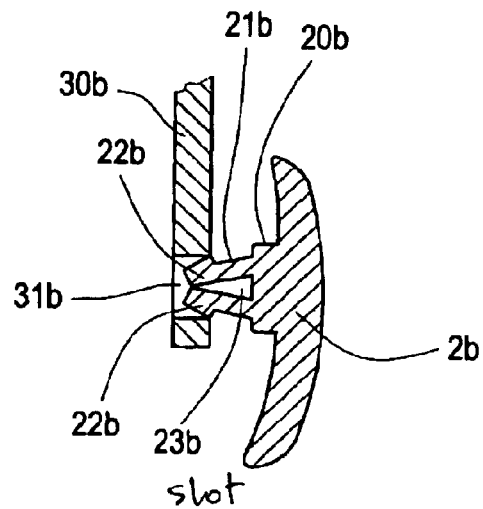
FIG. 4 is a cross-sectional view the prior art.
Figure 5:
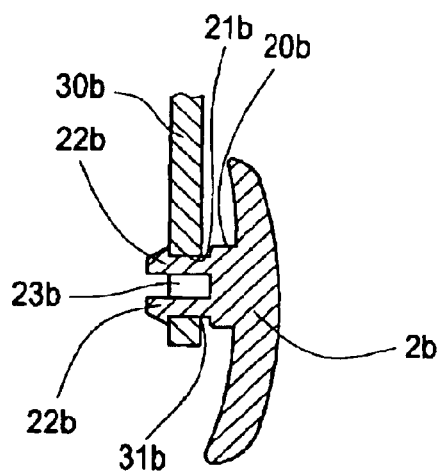
FIG. 5 is another cross-sectional view the prior art.
Figure 6:
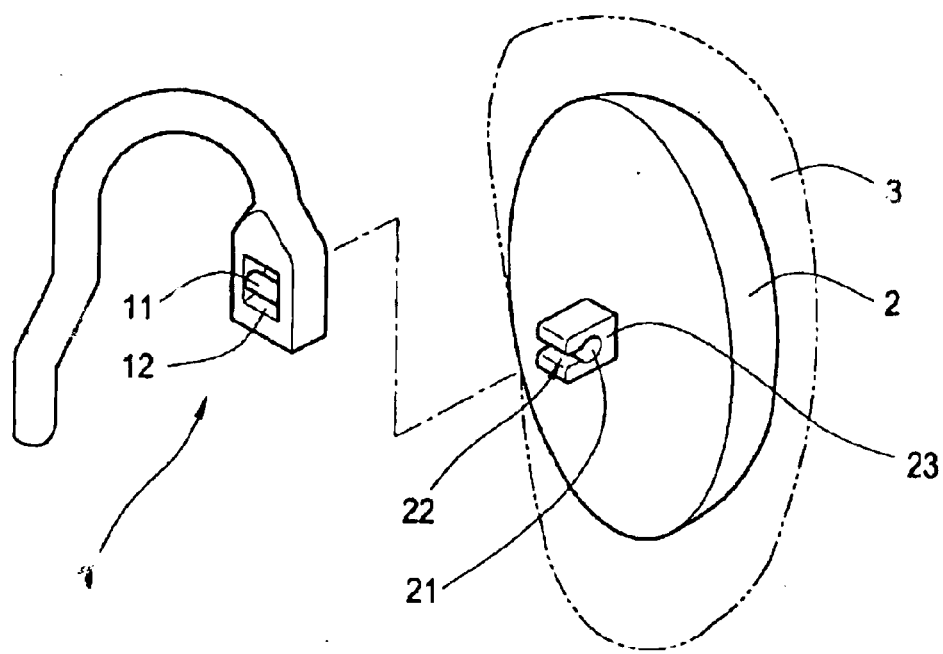
FIG. 6 is an assembly view of the present invention.
Figure 7:
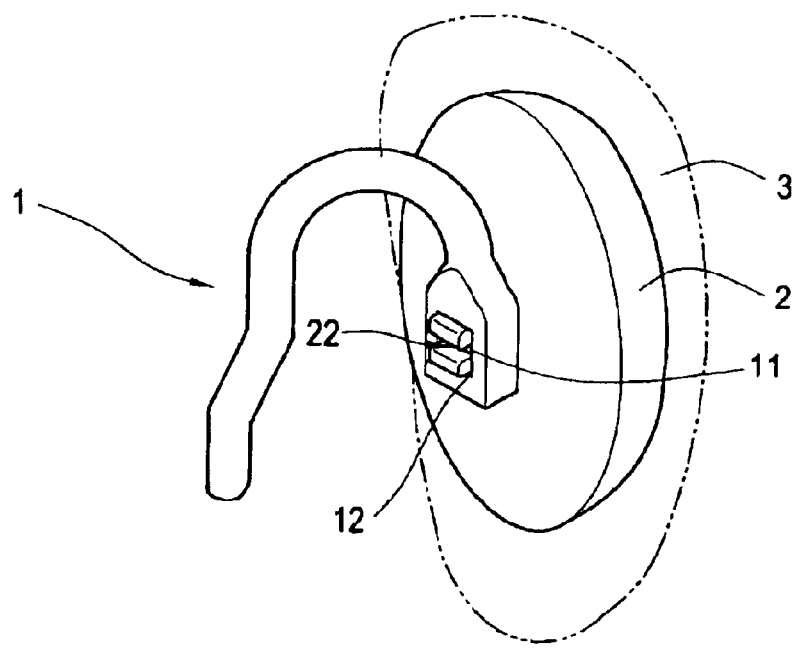
FIG. 7 is a perspective view of the present invention.

Referring to FIG. 6 and FIG. 7, the present invention is composed of a nose rack 1, a fastener 2 and a pad 3. An axis (shaft) 11 is on the nose rack 1. A sleeve 21 corresponding to the axis 11 is formed on the fastener 2. An insertion hole (slot) 22 is on the sleeve 21 to allow the insertion of the axis 11. The opening of the insertion hole 22 is smaller than the diameter of the axis 11.

Based on the structure described above, since the present invention applies the axis 11 and the sleeve 21 to combine the nose rack 1 and fastener 2 together, and since the opening of the insertion hole 22 is smaller than the diameter of the axis 11, the nose rack 1 and fastener 2 can be stably fixed; the sleeve 21 can thus move freely inside the insertion hole 22, and installation and removal are very convenient.

Figure 8:
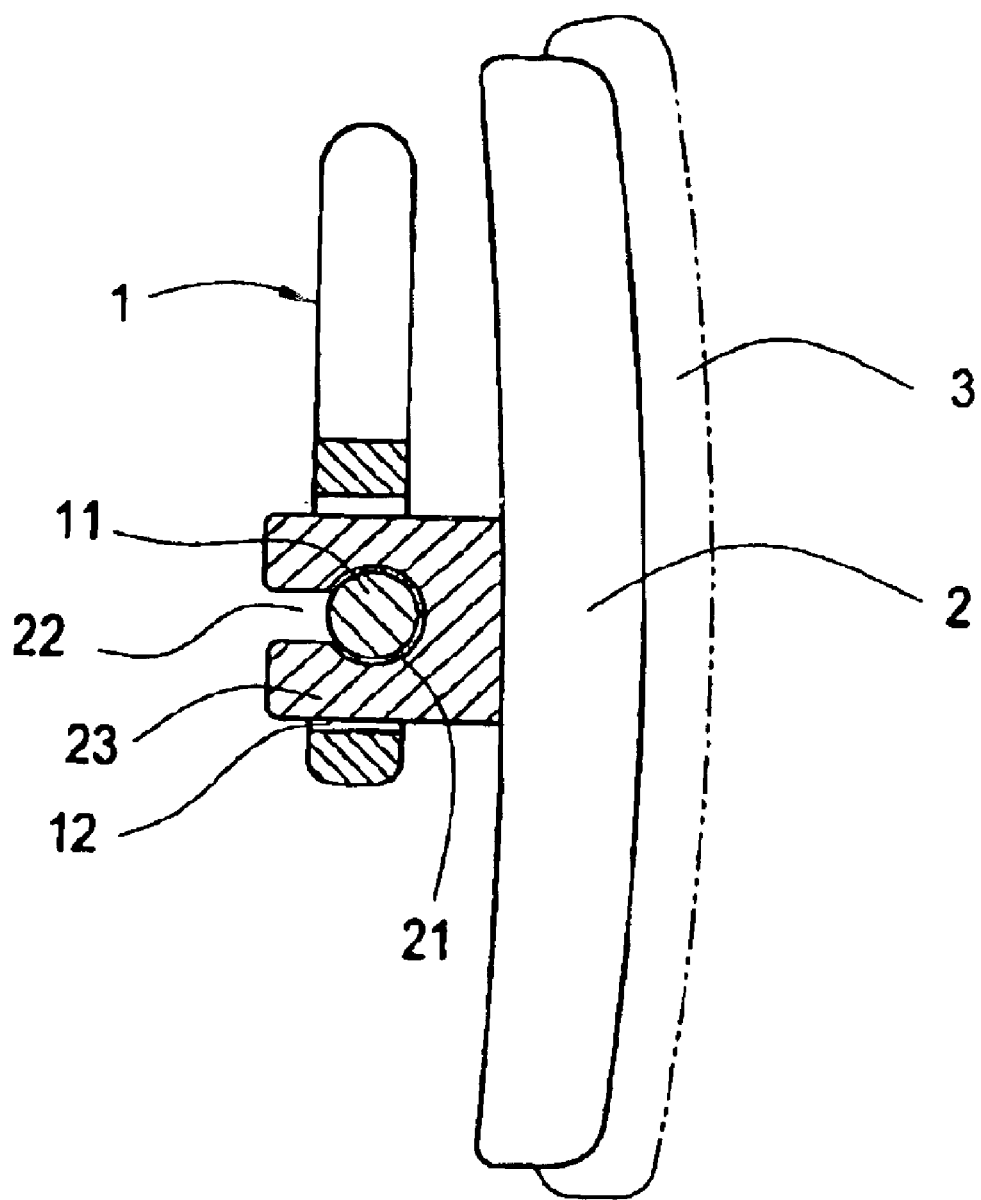
FIG. 8 is a cross-sectional view of the first application state of the present invention.
Figure 9:
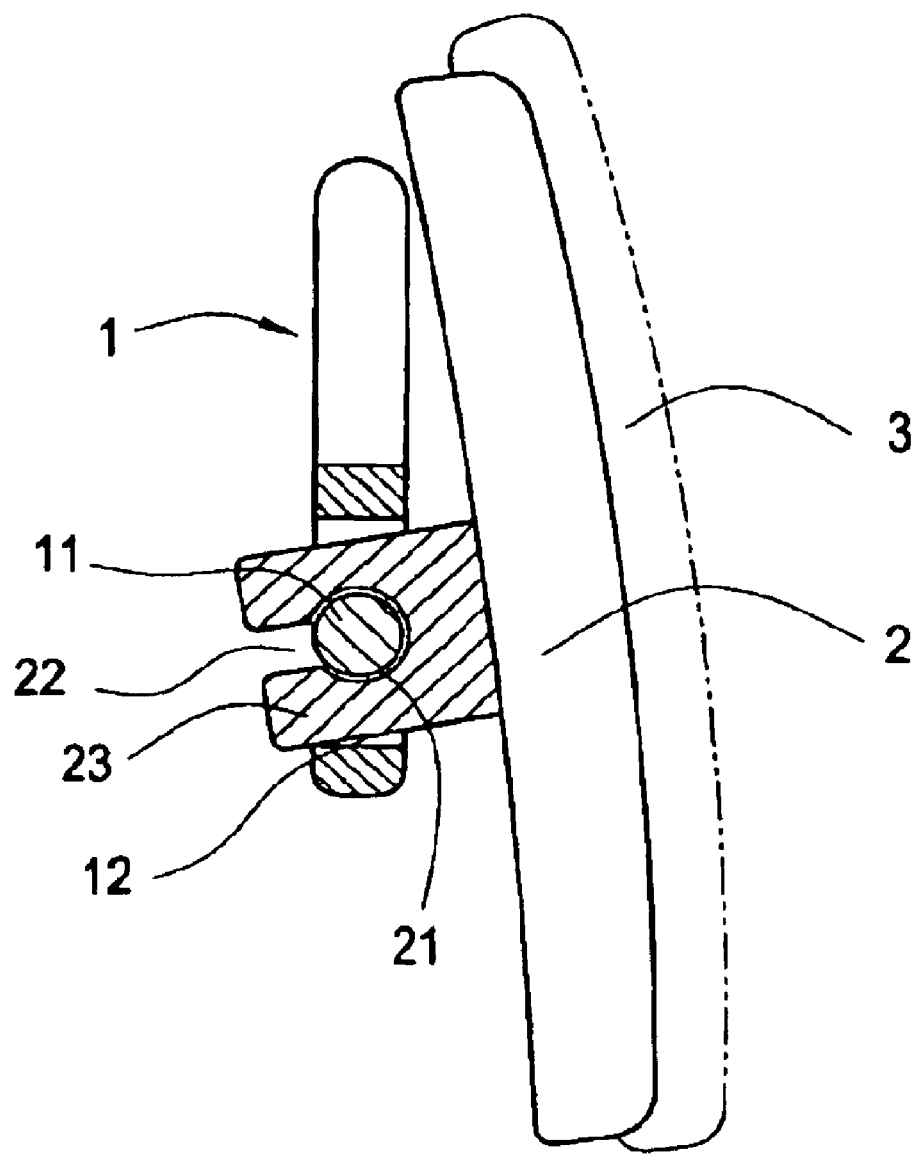
FIG. 9 is a cross-sectional view of the second application state of the present invention.
Figure 10:
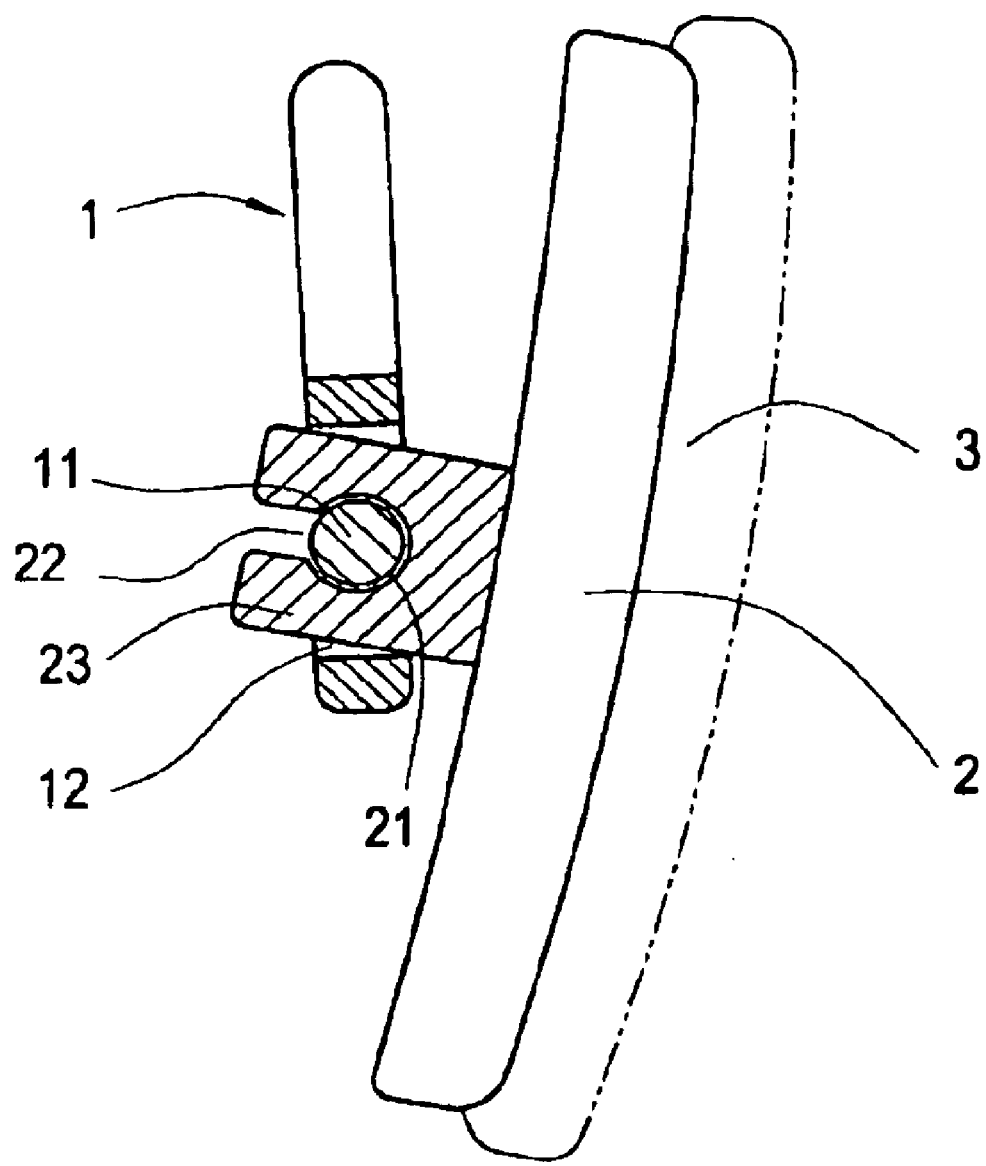
FIG 10 is a cross-sectional view of the third application state of the present invention.

In the real application, an open hole 12 is formed in the nose rack 1, the axis 11 in placed in the open hole 12, and a stem 23 is disposed on the fastener 2 and corresponds to the open hole 12. The insertion hole 22 and the sleeve 21 corresponding to the axis 11 are on the stem 23. The insertion hole 22 and the sleeve 21 of the stem 23 split the stem 23 into two portions to have the stem 23 stressed by evenly strength in installation and removal. The top of the stem 23 is very smooth for installation and removal without scratches and breakage. The width of the stem 23 is smaller than that of the open hole 12 for users to adjust the angle of the nose pad; FIG. 8, FIG. 9 and FIG. 10 are three different application states.

While a preferred embodiment of the invention has been shown and described in detail, it will be readily understood and appreciated that numerous omissions, changes and additions may be made without departing from the spirit and scope of the invention.

What is claimed is:

1. A nose pad of eyeglasses, comprising:

a nose rack having a fully enclosed open hole therein, and a shaft disposed in the open hole and being arranged to bisect the open hole;

a fastener having a stem that is receivable in the open hole, said stem having a sleeve formed therein that receives said shaft when said stem is received in the open hole, said stem further having an insertion slot that is in communication with said sleeve for inserting said shaft into the sleeve, an opening of said insertion slot being smaller than a diameter of said shaft so as to prevent said shaft from being removed from within the sleeve when said stem is received in the open hole; and a pad attached to said fastener.

2. The nose pad of eyeglasses recited in claim 1, wherein said insertion slot and said sleeve split said stem into two portions, so that when said stem is received in the open hole, one of the two portions is disposed on one side of said shaft, and another one of the two portions is disposed on another side of said shaft.

3. The nose pad of eyeglasses recited in claim 2, wherein a top of said stem is very smooth for installation and removal.

4. The nose pad of eyeglasses recited in claim 2, wherein a width of said stem is smaller than a width of the open hole.

5. The nose pad of eyeglasses recited in claim 1, wherein a top of said stem is very smooth for installation and removal.

6. The nose pad of eyeglasses recited in claim 1, wherein a width of said stem is smaller than a width of the open hole.

* * * * *